(12) United States Patent
Rogerson (10) Patent No.: US 6,837,176 B1
(45) Date of Patent: Jan. 4, 2005

(54) VESSEL TRANSITION HULL (76) Inventor: L. Keith Rogerson, #9 Fourth Ave., Isle of Palms, SC (US) 29451

( * ) Notice: Subject to any disclaimer, the term of this patent is extended or adjusted under 35 U.S.C. 154(b) by 0 days.

(21) Appl. No.: 10/355,880

(22) Filed: Jan. 31, 2003

(51) Int. Cl.⁷ .............................. B63B 1/32
(52) U.S. Cl. .................... 114/288; 114/291
(58) Field of Search ............... 114/274, 288, 114/291

(56) References Cited

U.S. PATENT DOCUMENTS

| | | |
|---|---|---|
| D113,668 S * | 3/1939 | Higgins .................... D12/300 |
| 5,140,930 A | 8/1992 | Lund |
| D355,881 S | 2/1995 | Carlson |
| D357,892 S | 5/1995 | Rolland et al. |
| 5,497,722 A * | 3/1996 | English, Sr. ................. 114/62 |
| D392,241 S | 3/1998 | Kierstead, Jr. |
| 6,138,602 A | 10/2000 | Cary |
| 6,289,838 B2 | 9/2001 | Dust |
| 6,406,341 B1 * | 6/2002 | Morejohn .................... 440/69 |
| 2002/0144639 A1 * | 10/2002 | Scarcella .................... 114/288 |

* cited by examiner

Primary Examiner—Stephen Avila
(74) Attorney, Agent, or Firm—Dority & Manning, P.A.

(57) ABSTRACT

A vessel is provided with a transition hull that hydroplanes the vessel on a water surface at a high speed and displaces the water surface at a low speed.

25 Claims, 6 Drawing Sheets

VESSEL TRANSITION HULL

BACKGROUND OF THE INVENTION

Hulls for boats, ships and other watercraft are known for planing on water at higher speeds and for water displacement at lower speeds. A wide variety of water surface conditions exist in which the hulls must safely plane as well as displace water. Typical water surface conditions include flat, smooth surfaces associated with protected bays and inlets, choppy waves found in open bays, and smooth or choppy swells in offshore ocean areas. Hulls designed to provide safe and comfortable transportation under one set of water conditions may be unsafe and uncomfortable when used under conditions different from those for which the hull was primarily designed.

For planing on water, a popular hull design for powerboats is a "V" configuration. The V configuration represents a compromise between lateral stability, such as may be achieved with a catamaran or flat bottom design, and a need to avoid excessive bouncing or "pounding" that occurs when a flat or rounded bottom vessel is propelled at higher planing speeds over a moderately choppy water surface. One drawback in most planing designs is that a wide forward arrangement may tend to act as an airfoil as the speed of the hull increases. The wide forward arrangement causes the hull to generate excessive lift in a forward portion of the vessel. This lift produces the up and down motion commonly known as "porpoising." The porpoising phenomenon is exacerbated in rough or choppy water in which the hull may be given an initial upward lift by a wave or swell, may be further lifted by the aerodynamic force of the air and, after reaching a maximum height, will fall back to the water surface to crash against the next wave. Such pounding is not only uncomfortable to passengers but may dangerously stress structural components of the vessel.

Where high-speed operation is desired, a deepening and narrowing of the V configuration is helpful in reducing the aerodynamic tendency of the hull to act as an airfoil and become airborne over the water surface.

The deep V also helps to part the water, resulting in a lessening of the pounding of the hull as it meets the water. A deep V with a 24-degree dead rise at a transom of the boat permits a softer water entry when the boat lands after leaving the water. Sharpening and lightening the forward arrangement for water entry may increase these advantages. Nearly all modern ocean-running, high-performance hulls include these features.

Further deepening of the V will ameliorate the vertical motion of the forward part of the hull, providing greater longitudinal stability while continuing to reduce the porpoising phenomenon. However, such benefits are gained at the expense of lateral stability. Further, the deep V hull has a natural tendency to rock and roll in moderate seas at slow speeds or while drifting. This places a practical limit upon the angle of the V that a hull may have without sacrificing comfort or safety.

Various tests suggest another V-hull drawback in which a greater power setting requiring a peak energy expenditure is required to overcome drag and hydroplane the conventional V-hull powerboat. Details of such tests are found in *Powerboat Reports*, August–November 2002, Belvoir Publications, Inc., Greenwich, Conn.

In sharp contrast to deep V configurations, catamaran and flat bottom hull are designed for displacing water at slower speeds. Such designs may incorporate a right-angle hard chine at or near the water surface. These flat bottom designs are exceptionally stable against lateral rolling, but because they lack the features of a V or deep V configuration, they are not well suited for high-speed travel, especially in rough water conditions.

A transition hull suitable for both planing a watercraft at higher speeds and for displacing water at lower speeds under most water surface conditions is needed.

BRIEF SUMMARY OF THE INVENTION

In general, the present invention is directed to a hull for a vessel that displaces water at lower speeds with good lateral stability and transitions efficiently to hydroplane the vessel at higher speeds. The component parts of the invention are simple, reliable, and economical to manufacture and use.

In one aspect of the invention, a vessel is provided with a bow, a stern, an amidships, a port side, a starboard side, and a topside. The vessel includes a transition hull disposed opposite the topside between the port side and the starboard side. The transition hull contacts a water surface to hydroplane the vessel on the water surface at a high speed and displaces the water surface at a low speed.

The transition hull extends from a convergence point in contact with the water surface proximate the amidships and diverges away from the water surface to terminate at the stern apart from the water surface to respectively form a port sponson, a starboard sponson, and a wash area therebetween. Each sponson forms a respective running surface in contact with the water surface and respective wash area faces that create a vortex in the wash area to disrupt a flow of water when the vessel is traveling at the high speed. At lower speeds the sponsons and wash area smoothly displace the water.

Other aspects and advantages of the invention will be apparent from the following description and the attached drawings, or can be learned through practice of the invention.

BRIEF DESCRIPTION OF THE DRAWINGS

The above and other aspects and advantages of the present invention are apparent from the detailed description below in combination with the drawings, in which.

DETAILED DESCRIPTION OF THE INVENTION

Detailed reference will now be made to the drawings in which examples embodying the present invention are shown. The drawings and detailed description provide a full and detailed written description of the invention and the manner and process for making and using it so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended claims and their equivalents.

The present invention is generally directed to a watercraft that has a transition hull designed to displace a water surface when the watercraft is traveling at a low speed and to transition to a planing hull as the watercraft increases speed to a higher planing speed. Although the watercraft described herein is rotationally molded ("rotomolded") of a polyethylene, for instance, and is a single person watercraft, the invention is not limited to the exemplary materials and sizes discussed herein. More specifically, the invention is intended for use with any size of ship, watercraft, or vessel designed for travel on a water surface. Therefore, the invention is applicable to multi-person watercraft as well as the single person example described herein.

The Figures generally show a watercraft designated by the numeral 10. The watercraft includes a front end or bow 12, a back end or stem 14, a left or port side 16, a right or starboard side 18, a top side 20, a middle section or amidships 22, and a transition hull 24. The watercraft 10 is rotomolded from polymers. For example, the watercraft can be made from cross-linked polyethylene (PE), linear low-density polyethylene (LLDPE), high-density polyethylene (HDPE), polyvinyl chloride (PVC), other polyolefins and similar moldable materials. The exemplary rotomolded watercraft 10 is seamless, and therefore virtually impervious to attack from salts and other corrosives found in most bodies of water, such as oceans, harbors, and inland waterways.

In comparison to injection and blow molding, rotomolding easily produces large and small, precision and non-precision parts in a cost effective manner. For instance, a tiny medical device to a 16-foot kayak can be rotomolded easily at a fraction of conventional vessel construction costs.

The rotomolding process starts with a quality cast or fabricated mold. The mold is placed in a rotomolding machine that has loading, heating, staging and cooling areas. By way of example, several molds are placed on the machine at the same time. Pre-measured plastic resin is loaded into each mold, and the molds are moved into an oven where they are slowly rotated on both vertical and horizontal axes. The melting resin sticks to the hot mold and coats every surface evenly. The mold continues to rotate during the cooling cycle so the parts retain a uniform wall thickness, if desired.

Once the rotomolded parts are cooled, they are released from the mold. The rotational speed, heating and cooling times are all controlled throughout the process and may be adjusted based on the design of the product.

Rotomolding is less expensive than injection molding because tooling for the rotomolding process does not have to be designed to maintain high pressures. Likewise, since rotomolded parts are formed with heat and rotation but not with pressure, the rotomolding molds also do not need to stand the high pressures of injection molding.

Rotomolding tooling is also far less expensive than blow molding because there is no internal core to manufacture. Since there is no internal core, minor changes can be easily made to an existing mold, which considerably reduces costs of product enhancements and line extensions. In turn, new products can be developed faster and marketed sooner.

Product conversions are also less expensive with rotomolding since lighter, less expensive materials replace heavier, often more costly materials. Further, rotomolding does not require complicated or expensive tooling changes to switch materials. These advantages make rotomolding as cost effective for one-of-a-kind prototypes as for larger production runs.

Also compared to injection molding and blow molding, rotomolding offers significant design advantages. For example, parts that were once assembled from several injection or blow molded pieces can be molded as a single part, eliminating expensive fabrication costs and streamlining the manufacturing process. Rotomolded parts also have consistent wall thickness and strong corners that are virtually stress free. If additional strength is required in a specific part, reinforcing ribs can be designed and molded into the part.

Other rotomolding advantages include providing weather-resistant, anti-static, dielectric, and other properties in the rotomolded product via a host of additives. Further, rotomolded parts can be provided in a range of colors and have permanent or molded-in logos and graphics. Inserts, threads, handles, undercuts, flat surfaces that eliminate draft angles, or fine surface details can also be designed at the outset. Also, multi-wall molding, which can be hollow or foam-filled, can be designed into a particular rotomolded product.

Although rotomolding has been described by way of example, it is to be noted that any other material such as metals, metal alloys, fiberglass and wood can be used to construct the watercraft 10 in various ways, such as by die-casting, hand-assembly or the like.

Figures 1, 2:
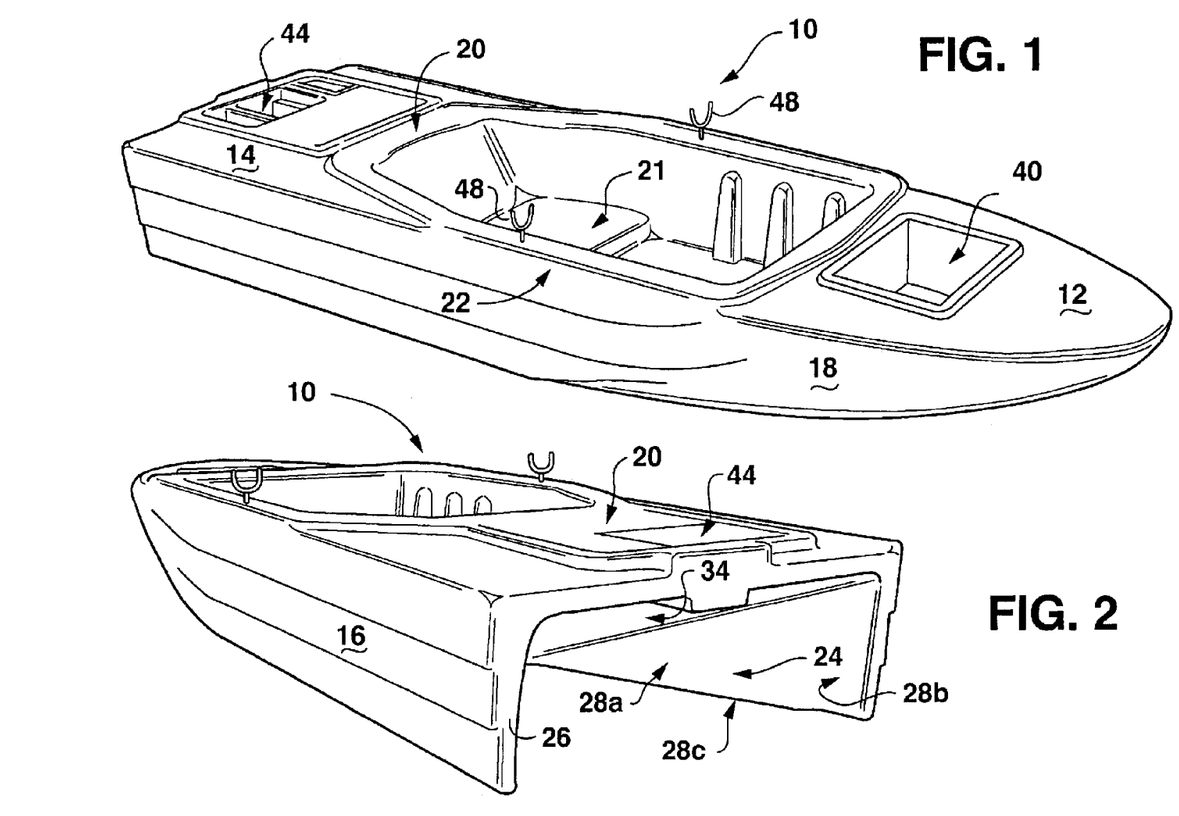
FIG. 1 is a first perspective view of a watercraft according to an aspect of the present invention.
FIG. 2 is a second perspective view of an end of the watercraft.

With particular reference to FIG. 1, a right side perspective view of the watercraft 10 shows the bow 12, the stern 14, the starboard side 18, the topside 20, and the amidships 22 briefly introduced above. The topside 20 includes an operator or storage area 21, a battery compartment or secondary storage area 40 and an engine mount area or tertiary storage area 44. The exemplary operator area 21 is suitable for an individual, but as introduced, the watercraft 10 can be constructed in sizes sufficient to carry two or more people. The battery compartment 40 can be equipped with a cover (not shown) to protect a battery (not shown) or other object susceptible to elements such as salt water and sea spray.

The engine mount area 44 shown in FIG. 1 is for an engine 46 (see FIG. 8) to provide power for the watercraft 10. In lieu of or in addition to the engine 46, an attachment device 48 for an oar (not shown) is provided in this example. The attachment device 48 can be a latch, a pin, a bracket, a yoke, an indentation in the watercraft 10, or any device or receptacle suitable to attach the oar to the watercraft 10 to move the watercraft 10 through the water.

FIG. 2 shows a rear perspective view of the watercraft 10 particularly showing the port side 16 and a view of the transition hull 24. A starboard sponson or fin 28 is shown with a forward end 28a and an after end 28b. As known in the industry, sponsons are small wings that project from a lower point of a hull to provide stability. In this example, the starboard sponson 28 also defines a running surface or knife-edge 28c. As will be described in greater detail below, the starboard sponson 28 in cooperation with a port sponson 26 forms a wash area 34.

Figure 3A:
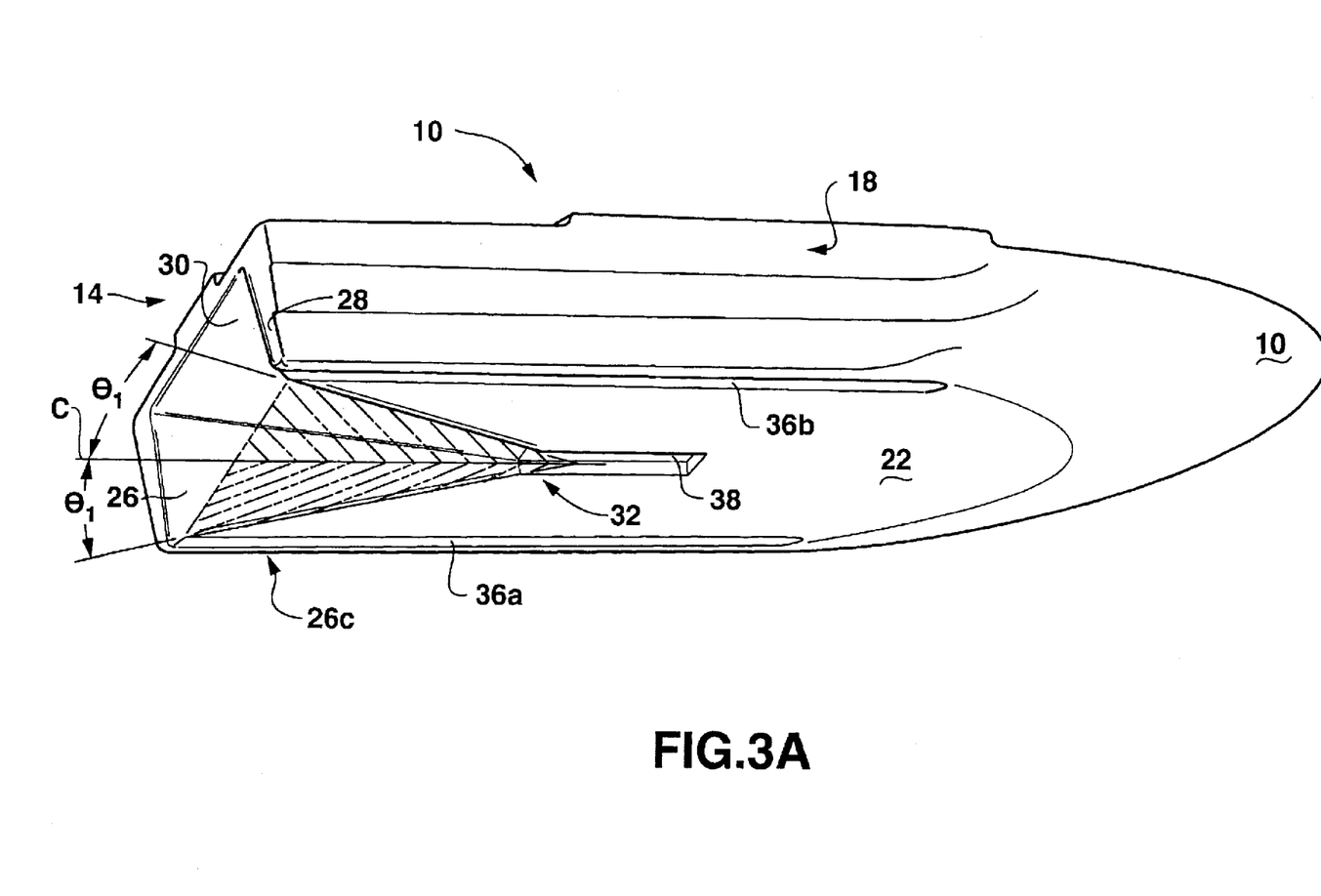
FIG. 3A is a third perspective view of a bottom of the watercraft particularly showing a rising keel in accordance with another aspect of the invention.
Figure 3B:
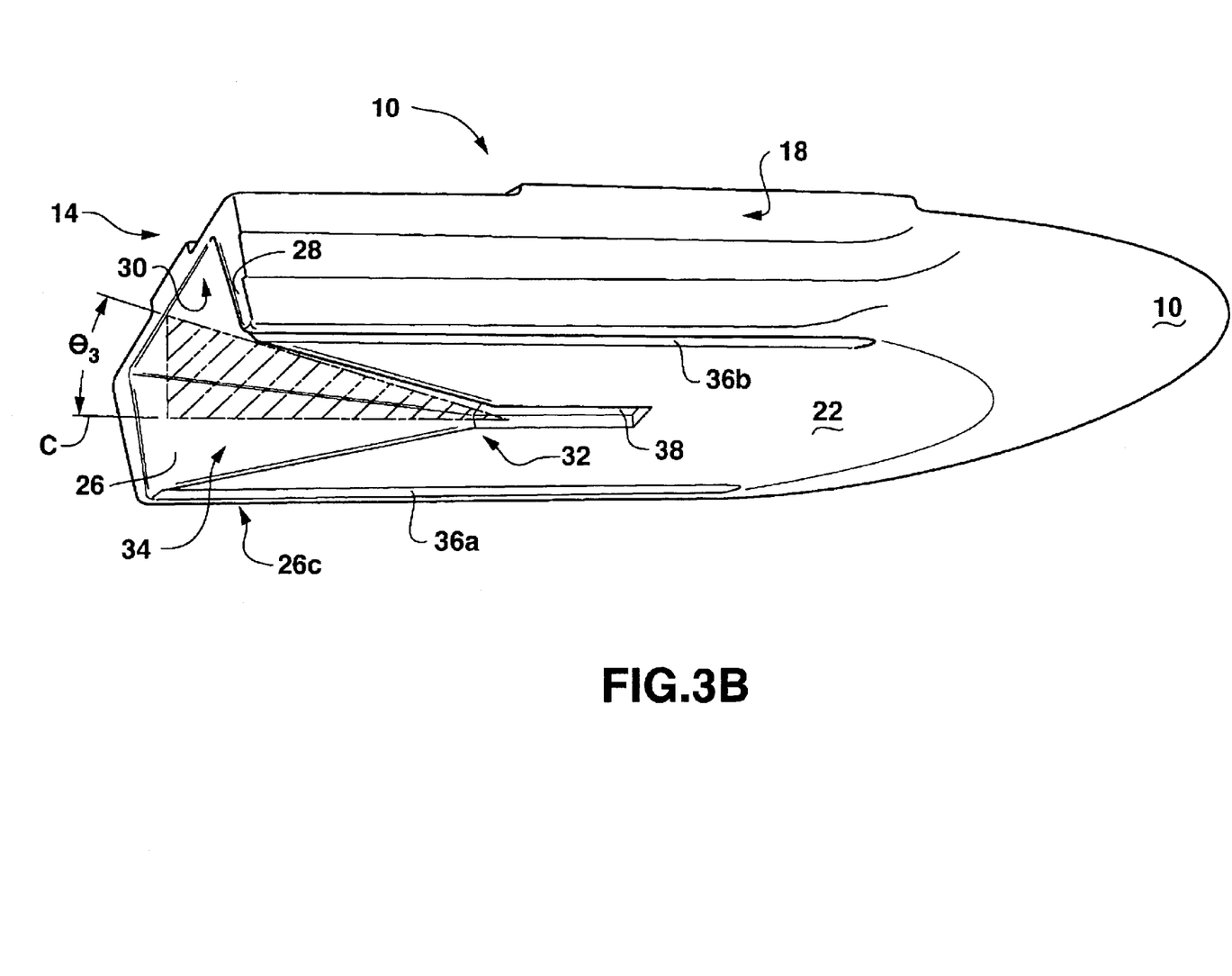
FIG. 3B is similar to FIG. 3A and shows an angular arrangement of sponsons in accordance with a further aspect of the invention.

FIGS. 3A and 3B show similar bottom views of the watercraft 10 including the port sponson 26, the starboard sponson 28, a convergence area or point 32, and a drain tube 38. In FIG. 3A, the sponsons 26,28 are shown depending from the stern 14 in a direction of the convergence point 32 from about 45 to about 10 degrees relative to a centerline or keel C as indicated by $\theta_1$. As explained in greater detail below with respect to FIG. 5, the starboard sponson 28, for example, also "rolls" from proximate a vertical plane V to about 60–135 degrees as indicated by arrow $\theta_2$ through a horizontal plane H towards the convergence point 32. These angles $\theta_1,\theta_2$ of the sponsons 26, 28 create rolling or changing respective wash area faces 26d, 28d.

FIG. 3B shows a "rising keel" or "vanishing transom" 30, which is defined from a convergence of the port and starboard sponsons 26, 28. Specifically, the vanishing transom 30 depends from the convergence point 32 to the stern 14 from about 25 degrees to about 80 degrees from the centerline C as indicated by $\theta_3$. This arrangement in conjunction with the rolling or changing angles $\theta_1,\theta_2$ previously described help form the wash area 34.

The drain tube 38 shown in FIGS. 3A and 3B operates with a drain plug, (not shown) within the watercraft 10 to drain water that may collect, for instance, in the operator area 21. Drain plugs and drain tubes 38 are known and further description is not required to understand this aspect of the invention.

Figure 4:
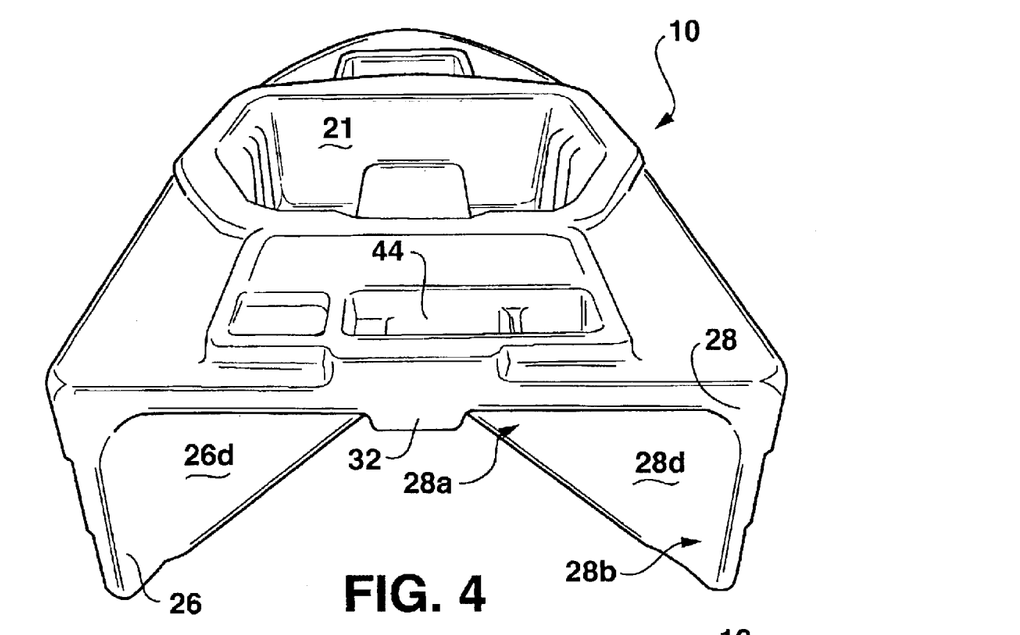
FIG. 4 is a top perspective view of the watercraft.

FIG. 4 shows a perspective view of the operator area 21, the port and starboard sponsons 26 and 28, and the engine mount area 44. The angular arrangement of the port and starboard sponsons 26 and 28 converging to the convergence point 32 is also clearly shown in FIG. 4.

Figure 5:
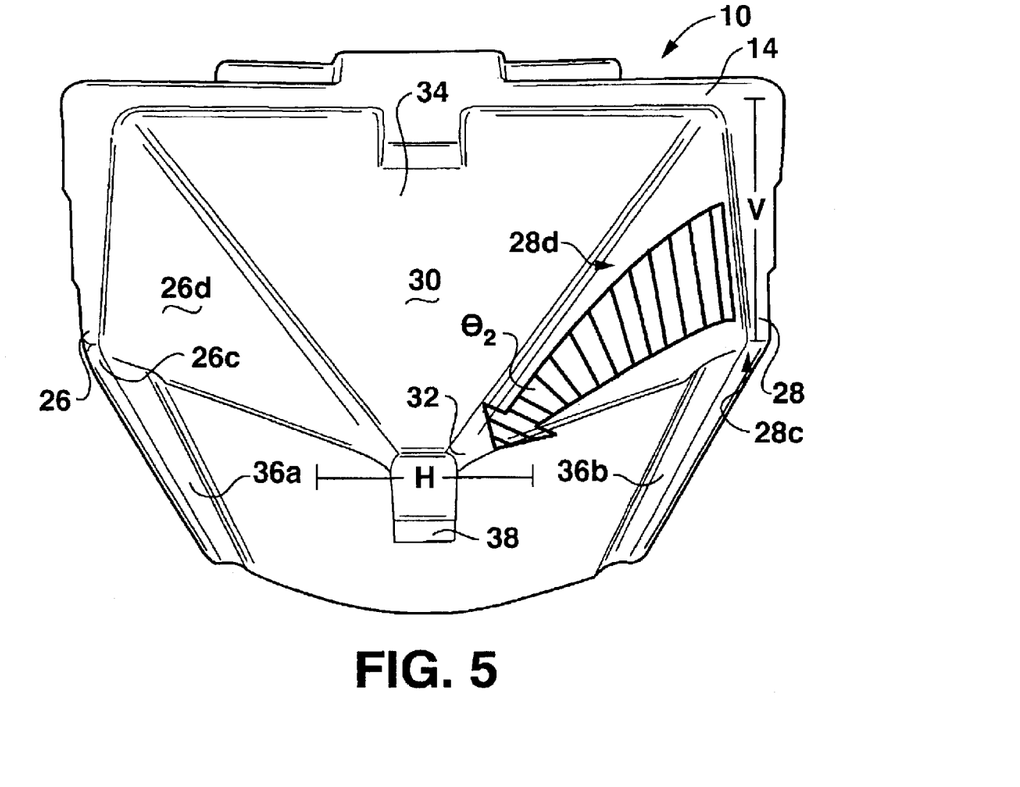
FIG. 5 is bottom perspective end-view of the watercraft particularly showing a changing angle of a wash area face in accordance with another aspect of the invention.

FIG. 5 shows a further view of the wash area 34 as it is defined by the vanishing transom 30 and the port and starboard sponsons 26 and 28. As introduced above with respect to FIGS. 3A and 3B, the wash area face 28d, by way of example, is integral with a knife-edge 28c. The knife-edge 28c is from about 1/20 of an inch to about 1/8 of an inch thick at the water surface proximate the vertical plane V. This arrangement in conjunction with the rolling angle $\theta_2$ permits the wash area face 28d within the wash area 34 to break a surface tension of the water as the watercraft 10 travels at a high speed. An example of this operation is described in further detail below.

Also shown in FIG. 5 are surfing rails 36a,b to control lateral movement of the watercraft 10. For instance, in a situation in which the watercraft 10 is planing on a surface of the water and encounters a face of a wave, the surfing rails 36a,b provide lateral control such that the watercraft 10 does not slide off of the wave and move sideways.

Figure 6:
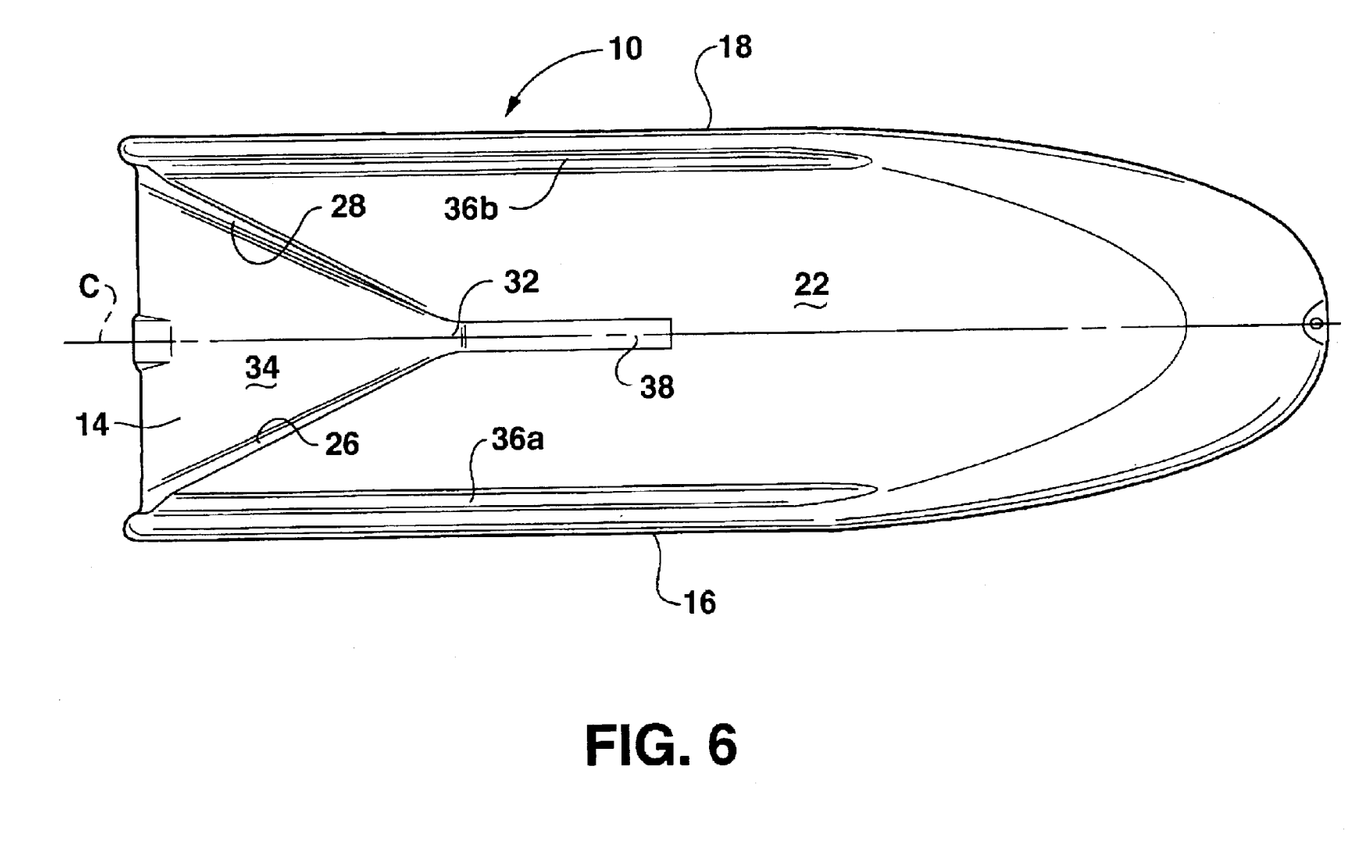
FIG. 6 is a bottom plan view of the watercraft.

In FIG. 6, a bottom plan view shows the surfing rails 36a, b disposed on either side of the keel C. The keel C is axially aligned with the drain tube 38 and runs from the bow 12 to the stern 14. In this aspect of the invention, the convergence area 32 is shown proximate the amidships 22. As described above and clearly shown in FIG. 6, the port and starboard sponsons 26 and 28 respectively depend away from the keel C in the direction of the port and starboard sides 16,18.

Figure 7:
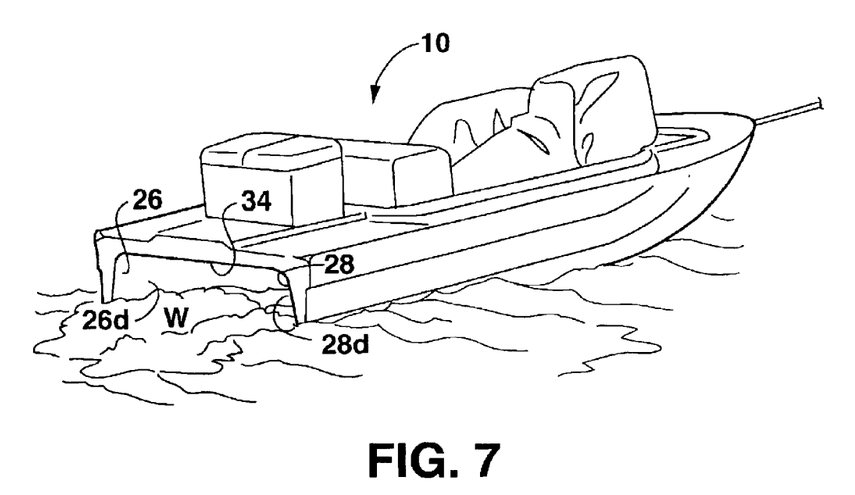
FIG. 7 is a fourth perspective view particularly showing the watercraft transitioning to a planing speed.

The invention may be better understood with respect to an exemplary operation of the watercraft 10 as will be described with reference to FIGS. 7 and 8. FIG. 7 particularly shows a vortex or "wash" W being created in the vicinity of the wash area 34 as the towing craft (not shown) tows the watercraft 10 at a speed of about 6 nautical miles per hour (knots). In this example, the operator area 21 is used as a storage area, and the engine mount area 44 is used as another storage area. The wash W is created as the port and starboard sponsons 26 and 28, their respective wash area faces 26d, 28d and their knife-edges 26c, 28c cause the water to shear off or separate in the wash area 34. More particularly, the knife-edges 26c, 28c draw air into the relatively open wash area 34 to break the water tension. As the water delaminates from the transition hull 24, it does not run or flow up the vanishing transom 30 (see FIG. 3), which allows the sponsons 26, 28 to hydroplane more easily.

The rolling angles $\theta_1,\theta_2$ of the wash area faces 26d, 28d and the relatively sharp knife-edges 26c, 28c provide a low drag coefficient compared to V-hull configurations. In contrast, as a typical displacement hull vessel increases speed, its bow will climb or rise up and its sponsons will submerse into the water. In other words, in the typical displacement hull the bow goes up while the stern gets sucked down. This action causes the water to roll up the stern and creates high turbulence.

Figure 8:
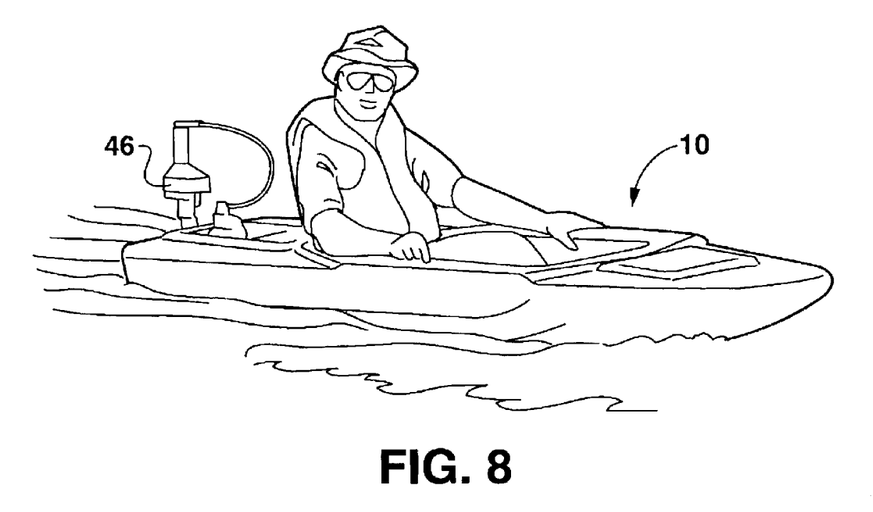
FIG. 8 is a fifth perspective end-view particularly showing the watercraft operating at a displacement speed.

In comparison to the foregoing hydroplaning operation, the watercraft 10 is shown operating in a displacement mode in FIG. 8. Due to the design of the sponsons 26,28 and the relatively open wash area 34 as previously described, the watercraft 10 displaces water smoothly and has lateral stability not found in the conventional V hull. As shown in FIG. 8, the watercraft 10 is moving at a relatively low speed (less than about 5 knots). At this relatively low speed, the water is displaced and slopes gently up the wash area faces 26d, 28d.

In the foregoing aspect, the watercraft 10 provides a smooth, water-displacement ride from zero to about 6 knots; transitions to a hydroplaning speed (about 6 knots) by allowing air to track down the knife edges 26c, 28c to break the water tension on the relatively concave wash area 34; and finally, hydroplanes at speeds of above about 6 knots to about 50 knots or more. It should be noted, however, that the transition and hydroplane speeds of the exemplary watercraft 10 are a function of hull length. For example, the watercraft 10 is about 6–8 feet from the bow 12 to the stern 14, which results in hydroplaning at about 6 knots. If a longer watercraft is provided, the transition speed to hydroplane will be higher; i.e., something greater than 6 knots depending on the desired hull length.

The present invention may be better understood with reference to the following Test and comparative data.

Test Conducted on an Exemplary Embodiment of the Invention

Test

In the following test, an exemplary watercraft, such as the watercraft 10 described above, was placed in a body of water and loaded with 150 pounds in the operator area 21. The loaded watercraft 10 had a total weight of 210 pounds. A scale was mounted in the watercraft 10 and attached by a line to a separate powerboat. From dead in the water, the powerboat was accelerated and substantially simultaneously pulled the watercraft 10 via the scale. At about 6 knots, air tracked down the knife edges 26c, 28c of the watercraft 10 to break the water tension on the wash area faces 26d, 28d. As the water tension broke, the water separated and sheared off the faces 26d, 28d in the wash area 34.

Results

The water shearing action of the transition hull 24 permitted the watercraft 10 to rise smoothly above the water surface and hydroplane without requiring additional momentary energy commonly required by conventional V-hull boats with flat transoms to overcome drag. Specifically, the watercraft 10 required power measured by the scale at about 47 pounds of pull. Table 1 below illustrates this transition to hydroplane at about 6 knots.

Table 1 further illustrates that once the watercraft 10 was hydroplaning, the power required to maintain the watercraft 10 on plane remained at about 47 pounds. In other words, the watercraft 10 had a drag coefficient that remained substantially unchanged, which corresponds to increased efficiency and reduced power requirements. In contrast, known powerboats with conventional V-hulls require extra power, at least momentarily, to transition to hydroplane since their drag coefficients change substantially between displacement and hydroplane operations. This is described in greater detail with respect to Table 2 below.

TABLE 1

Efficeincy vs. Speed

Comparative Data

Table 2 indicates that a conventional V-hull powerboat must overcome significant drag before it can hydroplane. The comparative data in Table 2 also suggests that the conventional powerboat hull generates considerable turbulence at lower speeds due to its high drag coefficient.

By way of example, the powerboat shown in Table 2 has a high drag coefficient when in a water displacement mode. Subsequently, the powerboat must expend a large amount of energy to rise out of the water initially; i.e., to hydroplane. This is indicated by the powerboat's relatively poor fuel efficiency as measured in miles per gallon (mpg). More specifically, when initially traveling at about 5 knots, the powerboat exhibits about 4.5 mpg. At about 8 knots, its fuel efficiency slips to less than 1 mpg as it fights to overcome its high drag coefficient to go up on plane. At about 15 knots, the fuel efficiency slightly increases again to about 1 mpg as the powerboat begins to hydroplane and its drag coefficient decreases.

TABLE 2

Efficiency vs. Speed for a V-Hull Boat

It will be apparent to those skilled in the art that various modifications and variations can be made in the present invention without departing from the scope and spirit of the invention. For example, specific shapes of various elements of the illustrated embodiments may be altered to suit particular applications. It is intended that the present invention include such modifications and variations as come within the scope of the appended claims and their equivalents.

That which is claimed is:

1. A vessel having a bow, a stern, an amidships, a port side, a starboard side, and a topside, the vessel comprising:
   a transition hull disposed opposite the topside between the port side and the starboard side and configured to contact a water surface to hydroplane the vessel on the water surface at a high speed and displace the water surface at a low speed,
   wherein the transition hull extends from a convergence point in contact with the water surface proximate the amidships and diverges away from the water surface to terminate at the stern apart from the water surface to respectively form a port sponson, a starboard sponson, and a wash area therebetween, and
   wherein each sponson defines a forward end, an after end, and a wash area face, the respective forward ends converging at the convergence point, the respective after ends diverging away from the convergence point and the transition hull along the water surface in a direction of the stern such that each sponson forms a respective running surface in contact with the water surface, the respective running surfaces and respective wash area faces configured to create a vortex in the wash area to disrupt a flow of water when the vessel is traveling at the high speed.

2. The vessel as in claim 1, wherein the transition hull is formed by one of rotomolding, injection molding, blow molding, and combinations thereof.

3. The vessel as in claim 1, wherein the transition hull is one of cross-linked polyethylene, linear low-density polyethylene, high-density polyethylene, polyvinyl chloride, a metal, a glass, a fiberglass, a wood and combinations thereof.

4. The vessel as in claim 1, wherein the vessel hydroplanes on the water surface from between about 6 knots to about 50 knots.

5. The vessel as in claim 1, wherein the vessel displaces the water surface from between about 0 knots to about 6 knots.

6. The vessel as in claim 1, wherein the transition hull is configured to transition from a displacement hull to a planing hull at about 6 knots.

7. The vessel as in claim 1, wherein the topside defines one of an operator area, an engine mounting area, a storage area, a battery compartment, and combinations thereof.

8. The vessel as in claim 7, wherein the battery compartment further comprises a cover.

9. The vessel as in claim 1, wherein the transition hull diverges away from the water surface proximate the amidships and terminates at the stern from between about 45 degrees to about 60 degrees.

10. The vessel as in claim 1, wherein the respective forward ends depend from the respective after ends from between about 45 degrees about 60 degrees to converge at the convergence point and form the respective wash area faces.

11. The vessel as in claim 1, wherein the respective wash area faces depend inwardly in the wash area from between about 25 degrees to about 135 degrees.

12. The vessel as in claim 1, wherein the respective wash area faces depend inwardly in the wash area from between about 45 degrees to about 110 degrees.

13. The vessel as in claim 1, wherein the respective wash area faces depend inwardly in the wash area from between about 25 degrees proximate the respective forward end to about 80 degrees proximate the respective after ends, the respective wash area faces configured to create the vortex at the high speed and break a water surface tension.

14. The vessel as in claim 1, wherein the respective wash area faces depend inwardly in the wash area from between about 25 degrees proximate the respective forward ends to about 80 degrees proximate the respective after ends, the respective wash area faces configured to create the vortex at the high speed and break a water surface tension.

15. The vessel as in claim 1, where in the respective wash area faces are integral with the respective running surfaces, the respective running surfaces defining a knife-edge of between about 1/20 inch to about 1/8 inch.

16. The vessel as in claim 1, further comprising a drain tube proximate the convergence point.

17. The vessel as in claim 1, further comprising a plurality of surf rails proximate respective running surfaces, the surf rails configured to control a lateral movement of the vessel.

18. The vessel as in claim 1, further comprising a foam injected in one of the bow, the stern, the port side, the starboard side, the amidships, and combinations there of to increase a buoyancy of the vessel.

19. The vessel as in claim 1, further including means for attaching an oar.

20. The vessel as in claim 19, wherein the means for attaching is a latch, a pin, an indentation, a holder, a bracket, a yoke and combinations thereof.

21. A vessel comprising:
  a transition hull configured to displace a water surface at a low speed and hydroplane the vessel on the water surface at a high speed, the transition hull extending from a convergence point in contact with the water surface and diverging away from the water surface,
  wherein the transition hull forms a port sponson, a starboard sponson, and a wash area therebetween, the port and starboard sponsons forming respective running surfaces in contact with the water surface, the respective running surfaces configured to disrupt a flow of water in the wash area to overcome a drag coefficient and hydroplane the vessel and wherein the drag coefficient is substantially constant for a transition speed to hydroplane from displacement and a speed greater than the transition speed.

22. The vessel as in claim 21, wherein respective wash area faces of the port and starboard sponsons depend inwardly in the wash area from between about 25 degrees to about 135 degrees.

23. The vessel as in claim 21, wherein the respective running surfaces define respective knife-edges of between about 1/20 inch to about 1/8 inch thick.

24. The vessel as in claim 21, wherein the vessel hydroplanes on the water surface as a function of the drag coefficient, a length of the vessel, and a power setting.

25. The vessel as in claim 21, wherein the vessel displaces the water surface as a function of the drag coefficient, a length of the vessel, and a power setting.

* * * * *